3,842,081
PREPARATION OF AMINOCARBOXYLIC ACIDS
FROM AMINOALCOHOLS
Heinz Schulze and Edward Thomas Marquis, Austin, Tex., assignors to Jefferson Chemical Company, Inc., Houston, Tex.
No Drawing. Filed Aug. 19, 1971, Ser. No. 173,316
Int. Cl. C07d 51/70
U.S. Cl. 260—268 R    11 Claims

ABSTRACT OF THE DISCLOSURE

A novel process is provided for preparing aminocarboxylic acids and their salts from certain aminoalcohols in the presence of alkali metal hydroxides and cadmium salts that is characterized by employing high temperatures and very short reaction times.

---

This invention relates to a novel process for preparing aminocarboxylic acids and their salts.

The preparation of aminocarboxylic acids for aminoalcohols in the presence of alkali metal hydroxides has heretofore been described. Further, the use of metal catalysts, such as cadmium, copper, nickel, zinc, silver, and the like, in the reaction has also been suggested. U.S. Pat. Nos. 2,384,816, 2,384,817 and 2,384,818 are representative of such knowledge.

Several patents have recently issued that demonstrate further efforts to improve upon this general process. U.S. Pat. Nos. 3,535,373, 3,535,374 and 3,535,375, hereinafter 3,535,373 et al., are exemplary and describe the use of alocohol, paraffin and aryl carbinol compounds as promoters for the preparation of aminocarboxylic acid salts from aminoalcohols. In like manner, U.S. Pat. No. 3,578,709 describes a process for preparing nitrilotriacetic acid alkali metal salts from triethanolamine in the presence of alkali metal hydroxides and cadmium catalyst wherein mixtures of alkali metal hydroxides are employed.

These recent methods for preparing aminocarboxylic acids have been extolled, such as in the above-identified patents, for their ability to provide improved yields of the alkali metal salts of the carboxylic acids. In this regard, the basic process art, such as represented by U.S. Pat. Nos. 2,384,816, 2,384,817 and 2,384,818, has been the subject of substantial criticism.

The recent art, as exemplified above, correctly points out the fact that although U.S. Pat. No. 2,384,817 describes the use of cadmium catalysts for the preparation of aminocarboxylic acids in the presence of alkali metal hydroxides the techniques employed and the methods used to determine the yields of desired product were not reproducible and were misleading. Accordingly, the examples presented in this patent series have based their reported yields upon the amount of reaction gas developed during the reaction and/or the chelating effect of the reaction product.

The danger in using chelating effects and gas development as the criteria for yield determination was amply demonstrated and reported in U.S. Pat. No. 3,535,373 et al., at column 2, lines 41 to 45. German Pat. No. 1,809,263 also reports that yields based on gas development are misleading. Further, the German patent states that the data presented in U.S. Pat. No. 2,384,817 are too vague of be useful. Our work, as will be hereinafter described, further confirmed these facts. It is noteworthy that in U.S. Pat. Nos. 3,535,373 et al. there was described an unsuccessful effort to duplicate the teachings of U.S. Pat. No. 2,384,817. Likewise, in Example IV of U.S. Pat. No. 3,578,709 similar difficulty was demonstrated in obtaining acceptable yields using the cadmium catalysts according to the teachings of U.S. Pat. No. 2,384,817.

Although recent improvements in the art of aminocarboxylic acid production have been made, such as represented by the art herein described, it is also apparent that although increased yields have, in some instances, been obtained, the described processes do not provide a comparatively simple process such as one that would facilitate a commercially feasible operation.

For example, the reaction times required, even with the use of the alcohol, paraffin, aryl carbinol promoters of U.S. Pat. Nos. 3,535,373 et al. the process is unduly long and is described therein as an extended reaction requiring about 8 to 70 hours.

Likewise, reaction times on the order of 6 hours, or more, are employed in U.S. Pat. No. 3,578,709.

It is evident from the recent art, as corroborated by our work, that the yields of aminocarboxylic acid as reported in U.S. Pat. Nos. 2,384,816 et al. are suspect and represent unduly long reaction times on the order of several hours.

It is a clear fact, therefore, that artisans in this field believe that reaction times on the order of several hours to several days are necessary for the cadmium catalyzed conversion of aminoalcohols to aminocarboxylic acids.

Another fact prevalent throughout the pertinent art and of general importance to this background discussion is the belief that high reaction temperatures are to be avoided because of the thermal instability of the aminocarboxylic acids and their salts.

For example, in U.S. Pat. No. 2,384,816 the practitioner is cautioned against the use of high temperatures when oxidizing aminoalcohols by heating in the presence of caustic alkalis because of the general thermal instability of the aminocarboxylic acids and their salts under such conditions.

Adherence to this fact is also evidenced by Dwyer & Mellor *Chelating Agents and Metal Chelates*, Academic Press, New York, 1964, where at page 287 it is stated:

" . . . The main difficulty in the reaction (of aminoalcohols to yield aminocarboxylic acids) is in preventing the oxidation of the strongly reactive amino groups which are susceptible to attack by alkalis and oxidizing agents . . . ."

The avoidance of high temperatures is likewise taught and practiced in U.S. Pat. No. 3,578,709 and in U.S. Pat. Nos. 3,535,373 et al.

For example, although U.S. Pat. Nos. 3,535,373 et al. generally state that temperatures of about 150° C. to 260° C. can be employed, they state that temperatures from 190° C. to 240° C. are preferred. Reference to any of their examples clearly shows that temperatures higher than 240° C. were strictly avoided.

In like fashion, broad temperatures of 150° C. to 300° C. are generally described in U.S. Pat. No. 3,578,709, but all of the representative examples were conducted essentially within the preferred temperature range described above, i.e., 160° C. to 248° C.

In summary, the prior art recognizes and practices, without known exception, two important beliefs:

(a) The avoidance of high temperatures such as those greater than about 240° C., and (b) The necessity of long reaction times on the order of hours or more.

In spite of the above knowledge and beliefs, we have surprisingly discovered that we can prepare aminocarboxylic acids from certain aminoalcohols in high yields in the presence of alkali metal hydroxides and cadmium salts at high temperatures, and at times, seemingly impossible according to prior art standards.

Accordingly, an important aspect of our process was the discovery that certain aminocarboxylic acid salts have an unexpectedly high temperature stability in the presence of aqueous alkali metal hydroxides and cadmium salts.

Further, because of our discovery certain aminocarboxylic acids and their salts can now be prepared at reaction conditions that can enable economically commercial feasible processes.

Therefore, in accordance with our process, selected aminoalcohols are heated in the presence of an alkali metal hydroxide and a cadmium catalyst at a temperature in the range of about 245° C. to 350° C., preferably about 250° C. to 300° C., for a time in the range of about 5 to 45 minutes, preferably in the range of about 10 to 35 minutes.

Starting materials, i.e., the aminoalcohols that can be employed according to our invention can be representatively depicted by the following formula:

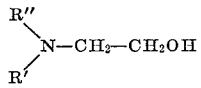

wherein R' represents hydrogen, or a radical selected from —CH$_2$CH$_2$OH, C$_1$ to C$_{15}$ alkyl, or an aminoalkyl radical containing two to three carbon atoms, such as

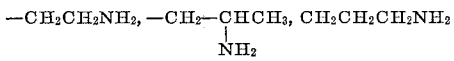

and the like, and R" represents hydrogen or a radical selected from phenyl, a C$_1$ to C$_{15}$ alkyl substituted phenyl, or a C$_1$ to C$_{15}$ alkyl; and when R' represents the

—CH$_2$CH$_2$OH radical, R" can be further selected from the following additional radicals

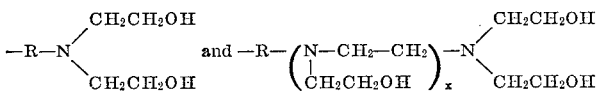

wherein R represents an alkylene radical containing two to three carbon atoms and $x$ represents an integer of 1 to 3; and wherein each R' and R" can also represent methylene radicals or lower C$_1$ to C$_3$ alkyl substituted methylene radicals such that when taken with

>N—CH$_2$—CH$_2$OH they comprise a portion of an N-substituted piperazine compound which compound can be further represented by the following formula:

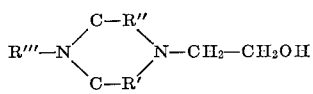

wherein R''' represents hydrogen, or a radical selected from a C$_1$ to C$_4$ alkyl or —CH$_2$CH$_2$OH.

Representative aminoalcohols corresponding to the above representative formulas include monoethanolamine;
N-phenylethanolamine;
N-nonylethanolamine;
N-nonylethanolamine;
N-nonylphenylethanolamine;
diethanolamine;
N-phenyldiethanolamine;
N-ethyldiethanolamine;
N-isopropyldiethanolamine;
N-nonylphenyldiethanolamine;
N-ethyl, N-phenylethanolamine;
N,N-(diethyl)ethanolamine;
N-ethyl,N-nonylphenylethanolamine;
N-(2-aminoethyl)ethanolamine;
N-(3-aminopropyl)ethanolamine;
N-phenyl, N-(2-aminoethyl)ethanolamine;
N-ethyl, N(2-aminoethyl)ethanolamine, and the like.

Cadmium salts, such as the acetate, propionate, butyrate, oxide, chloride, sulfate, admixtures thereof, and the like, are representative catalysts and can be suitably employed in amounts effectively determined by the skilled artisan. Generally, an effective amount is within the practical range of about .4 to 10 grams of cadmium salt per mol of the aminoalcohol employed.

Conversion of the aminoalcohol to the aminocarboxylic acids is conducted in the presence of alkali metal hydroxides, or admixtures thereof, such as sodium hydroxide, postassium hydroxide, and the like. They are generally employed in amounts to provide a stoichiometric quantity relative to the aminoalcohol employed. Excess alkali metal hydroxides are usually provided however. Sufficient water is employed to essentially maintain the components in the reaction medium essentially in solution. Sufficient pressure is usually employed to essentially maintain the water in the liquid phase. The reaction medium can be prepared by mixing the reactants in any order that is desired. If desired, all the reactants can be added to the vessel and the contents then heated to the reaction temperature or alternatively a portion can be added incrementally and good results achieved.

In general, the aminocarboxylic acids produced by this process are known compounds with many known uses for them. Thus, they are chemical intermediates and are valuable raw materials and will undergo reactions characteristic of carboxylic acids.

In addition, the salts are useful in their own rights. For example, the iminodiacetic acid compounds and the substituted iminodiacetic acid compounds are water softeners and chelating agents. The long chain alkyliminodiacetic acids are particularly useful for foam-promoting additives in detergent formulations and related products. The piperazine diacetic acid compounds are particularly useful to enhance the strength of paper.

The aminocarboxylic acids and their salts produced according to this invention can be recovered by techniques well within the skill of the artisan in this field. For example, the reaction mixture can be acidified and the aminocarboxylic acid recovered by solvent separation. Likewise, the aminocarboxylic acid salts can be recovered by solvent separation. Suitable solvents include acetone, benzene, chloroform, diethylether, methanol, ethanol, isopropanol, and the like.

To illustrate the foregoing discussion and description and not to be interpreted as a limitation on the scope thereof, or on the materials herein employed, the following examples are presented. The following examples are accordingly demonstrative of our invention and demonstrate seemingly impossible achievements according to prior art standards and beliefs.

EXAMPLE I

In a 1-liter stirred Monel lined reactor 2.0 mols of diethanolamine, 6.0 mols sodium hydroxide, 300 grams water and 16.0 grams cadmium oxide were admixed. The mixture was heated under nitrogen at 250° C. for 15 minutes and 6.2 cubic feet of hydrogen off-gas was liberated. The reaction mixture was then diluted with water, filtered and methanol added to precipitate the disodium salt of the iminodiacetic acid. The disodium salt of the iminodiacetic acid was washed with cold methanol and dried in a heated (60 C.) vacuum desiccator. Infrared spectrum analysis was identical with that of a pure authentic sample. The yield of disodium salt of iminodiacetic acid (monohydrate) was surprisingly 84.5%.

EXAMPLE II

As in the method of Example I, 2.0 mols of N,N-dimethylethanolamine, 5.0 mols sodium hydroxide, 250 grams water and 11.0 grams cadmium oxide were heated under nitrogen for 30 minutes at 250° C. to 280° C. liberating 2.4 cubic feet of hydrogen. To the reaction mixture was added 300 ml. water and the solids were mostly dissolved by stirring overnight. The mixture was filtered and the filtrate treated with isopropanol and white crystals formed which were washed and dried. The nuclear magnetic resonance spectrum and nitrogen analysis proved the preparation of the sodium salt of dimethylaminoacetic acid. The yield of the sodium salt of dimethylaminoacetic acid was 78.5%.

EXAMPLE III

As in the method of Example II, 1.0 mol N-phenyldiethanolamine, 3.0 mols sodium hydroxide, 150 grams water and 10 grams cadmium oxide were heated at a temperature of 270° C. for 30 minutes. The reaction mixture was worked up as in Example II except that the reaction mixture was first acidified to a pH of 2.8. The light yellow solid product was washed with ice water and dried in a vacuum desiccator. The nuclear magnetic resonance and the infrared spectra confirmed the structure of the product as N-phenyliminodiacetic acid. The yield of the diacetic acid was 86.5% basis the N-phenyldithanolamine charged.

EXAMPLE IV

As in the previous examples, except that a copper-lined reactor was employed, 0.5 mol N-nonyldiethanolamine, 2.0 mols sodium hydroxide, 80 grams water and 6 grams cadmium oxide were heated at 275° C. for 30 minutes. The reaction mixture was treated and worked up as described in Example III and the yield of the disodium salt of N-nonyliminodiacetic acid was 80%. NMR and infrared spectra analysis confirmed the structure on N-nonyliminodiacetic acid.

EXAMPLE V

In a 1-liter stirred Monel lined reactor were admixed 1.0 mol bis(hydroxyethyl)piperazine, 4.0 mols sodium hydroxide, 164 grams water, and 10 grams cadmium oxide. The reaction mixture was heated under nitrogen for 15 minutes at 261° C. to 273° C. The reaction mixture was dissolved in 550 ml. water with gentle heating. The mixture was filtered and allowed to cool. White long needles formed and were recovered by filtration. Disodium salt of piperazine diacetate in the amount of 184.8 grams were recovered. The structure was confirmed by infrared analysis, NMR spectra analysis as well as nitrogen analysis and electrometric titration.

EXAMPLE VI

In a stirred copper-lined Hastelloy B autoclave were placed dodecyliminodiethanol (prepared from 1-chlorododecane and diethanolamine, hydroxyl number 421), 147.5 grams sodium hydroxide, 135 grams water, and 6.4 grams cadmium oxide and heated 22 minutes at 270° C. to 280° C. Maximum pressure was 3,900 p.s.i.

The cooled solidified reaction product was dissolved in a boiling 1:1 mixture of methoxyethanol-water, the turbid solution cleared with Super-Cel filter aid and cooled. The precipitated reaction product was dried at 100° C. in vacuum. Yield was 166 grams. NMR and IR data agreed with the structure of dodecyliminodiacetic acid (sodium salt).

Surface tension of the product was 29 dynes/cm. in 0.1% aqueous solution. Ross-Miles test indicated a foam height of 173/165 mm. after 5 minutes.

The preceding examples can be repeated with similar success by substituting the generically and specifically described reactants and conditions of this invention for those employed in the examples. As will be evident to those skilled in the art, various modifications of this invention can be made or followed in light of the discussion and disclosure herein set forth without departing from the spirit or the scope thereof.

We claim:
1. An aqueous process for preparing aminocarboxylic acid salts comprising the steps of heating an aminoalcohol in the presence of at least a stoichiometric quantity, based upon the aminoalcohol employed, of sodium hydroxide, cadmium salts, and sufficient water to maintain the components in the reaction medium in solution, said aminoalcohol being represented by the following formula:

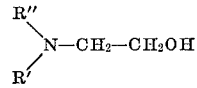

wherein R' represents hydrogen or a group selected from —CH$_2$CH$_2$OH, a C$_1$ to C$_{15}$ alkyl, or an aminoalkyl group having two to three carbon atoms; and R" represents hydrogen or a group selected from phenyl, a C$_1$ to C$_{15}$ alkyl substituted phenyl, or a C$_1$ to C$_{15}$ alkyl; and wherein each R' and R" can also represent methylene groups or lower C$_1$ to C$_3$ alkyl substituted methylene groups, such that when taken with N—CH$_2$CH$_2$OH they comprise a portion of an N-substituted piperazine compound which compound can be further represented by the following formula:

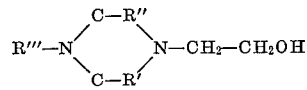

wherein R''' represents hydrogen, or a group selected from a C$_1$ to C$_4$ alkyl or —CH$_2$CH$_2$OH; and wherein said heating is conducted at a temperature in the range of about 250° C. to 300° C. for a time in the range of about 5 to 45 minutes under a pressure sufficient to maintain the water in liquid phase.

2. The process according to Claim 1 wherein said heating is conducted at a temperature within the range of about 250° C. to 300° C. for a time in the range of about 10 to 35 minutes.

3. The process according to Claim 2 wherein R' represents an aminoalkyl group and R" represents hydrogen.

4. The process according to Claim 2 wherein R' and R" represent alkyl groups.

5. The process according to Claim 2 wherein R' represents the —CH$_2$CH$_2$OH group.

6. The process according to Claim 5 wherein R" represents the phenyl group.

7. The process according to Claim 5 wherein R" represents an alkyl substituted phenyl group.

8. The process according to Claim 5 wherein R" represents hydrogen.

9. The process according to Claim 5 wherein R" represents an alkyl group.

10. The process according to Claim 2 wherein R' and R" represent methylene groups such that when taken with >N—CH$_2$—CH$_2$—OH they comprise a portion of an N-substituted piperazine compound which compound can be further represented by the following formula:

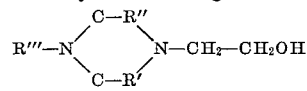

wherein R''' represents hydrogen, or a group selected from a C$_1$ to C$_4$ alkyl or —CH$_2$CH$_2$OH.

11. The process according to Claim 10 wherein R''' represents —CH$_2$CH$_2$OH, and wherein R' and R" each represent methylene groups.

References Cited
UNITED STATES PATENTS

| | | | |
|---|---|---|---|
| 2,384,817 | 9/1945 | Chitwood | 260—534 R |
| 3,535,375 | 10/1970 | Jackisch | 260—534 E |
| 3,578,709 | 5/1971 | Bishop et al. | 260—534 E |
| 3,644,444 | 2/1972 | Popper et al. | 260—534 E |
| 3,708,533 | 1/1973 | Bechara | 260—268 R |
| 2,834,782 | 5/1958 | Schlesinger | 260—268 R |
| 3,642,887 | 2/1972 | Jackisch | 260—518 R |
| 3,717,676 | 2/1973 | Bechara et al. | 260—531 C |

DONALD G. DAUS, Primary Examiner

U.S. Cl. X.R.

260—518 R, 531 C, 534 E, 534 R, 584 R